May 9, 1944.　　　　E. G. HENRY　　　　2,348,434
COIN-CONTROLLED SELECTOR
Filed Feb. 16, 1942　　　　6 Sheets-Sheet 1
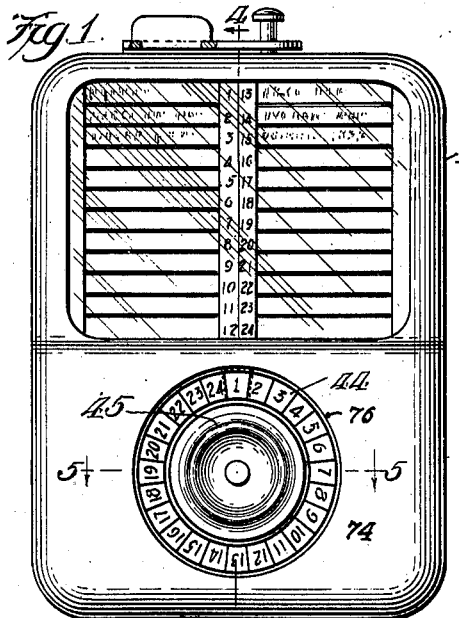
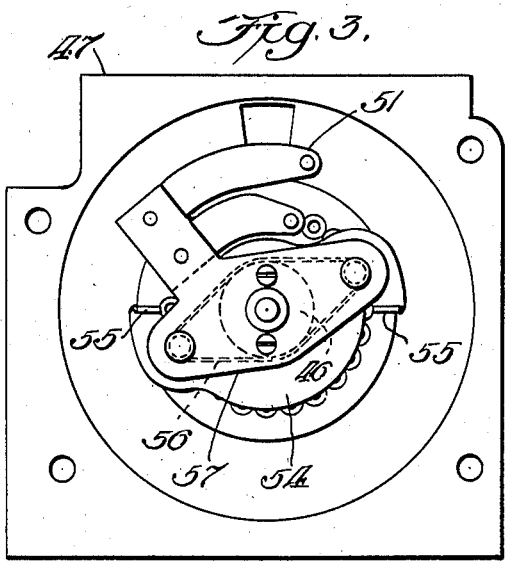
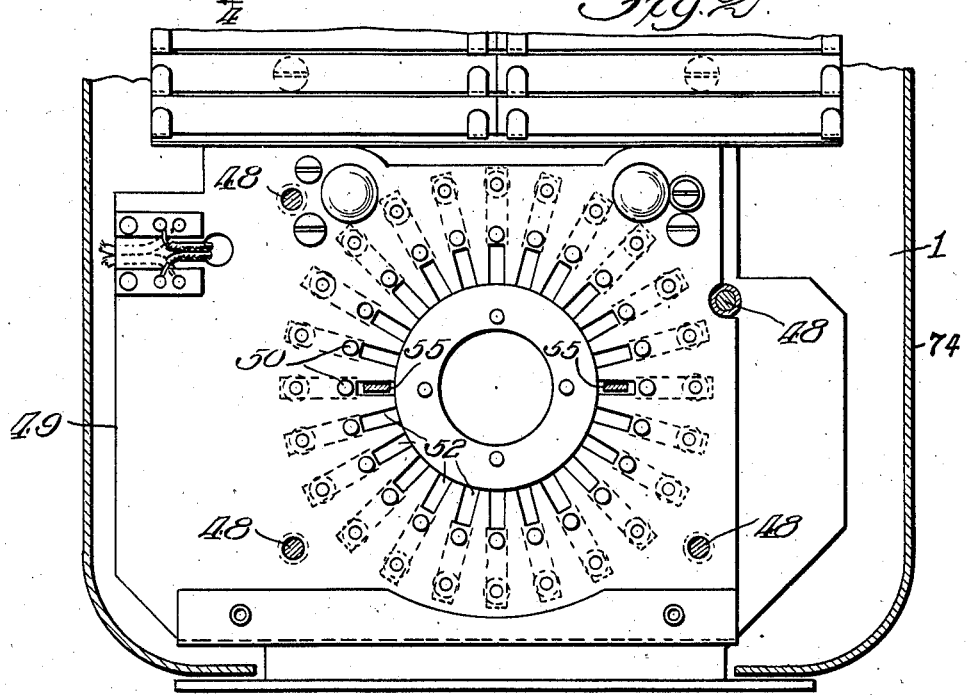
Inventor:
Earle G. Henry,
by Wm. F. Freudenreich
Atty.

May 9, 1944.　　　　E. G. HENRY　　　　2,348,434
COIN-CONTROLLED SELECTOR
Filed Feb. 16, 1942　　　6 Sheets-Sheet 2
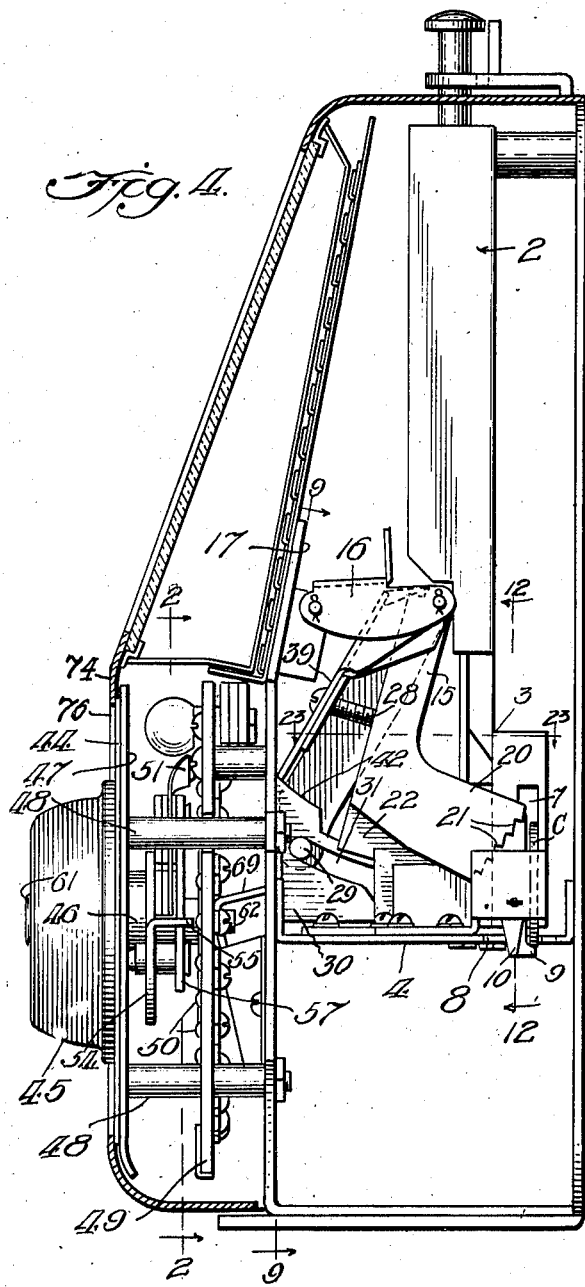
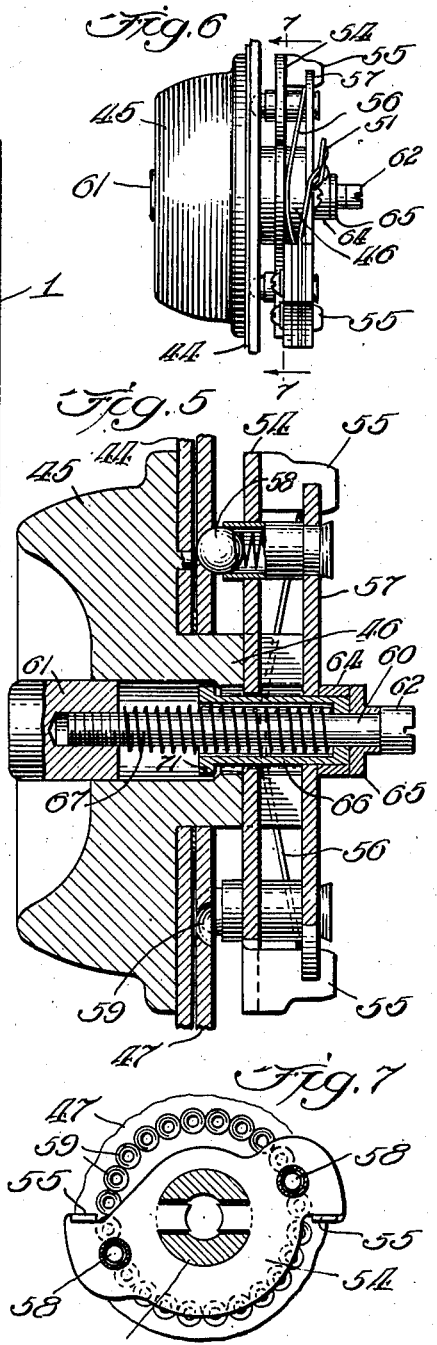
Inventor:
Earle G. Henry,
By Wm F. Freudenreich,
atty.

May 9, 1944.                E. G. HENRY                2,348,434
                       COIN-CONTROLLED SELECTOR
                       Filed Feb. 16, 1942        6 Sheets-Sheet 3
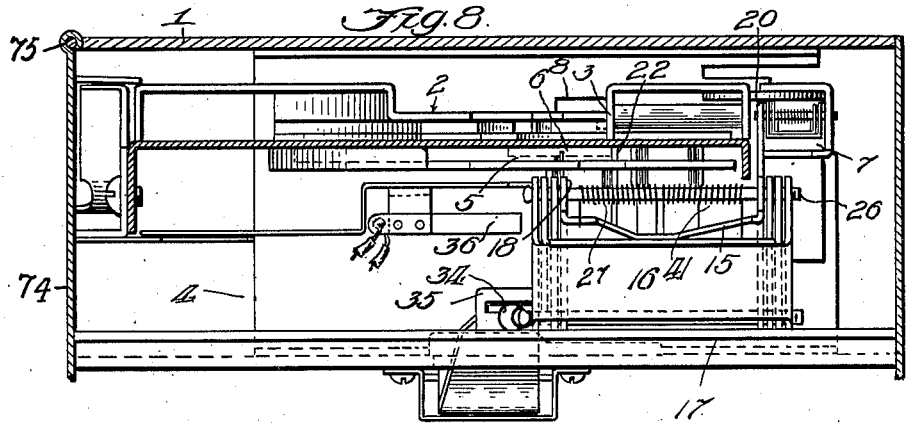
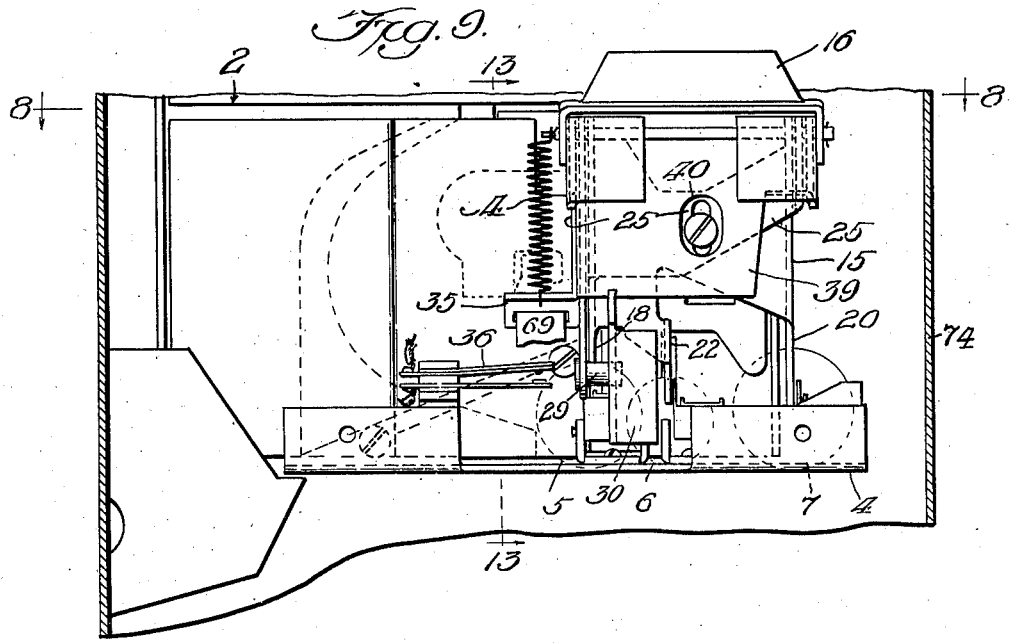
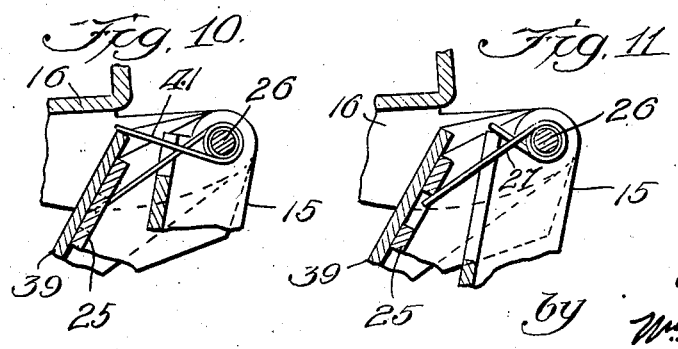
Inventor:
Earle G. Henry.
by Wm. F. Freudenreich,
Atty.

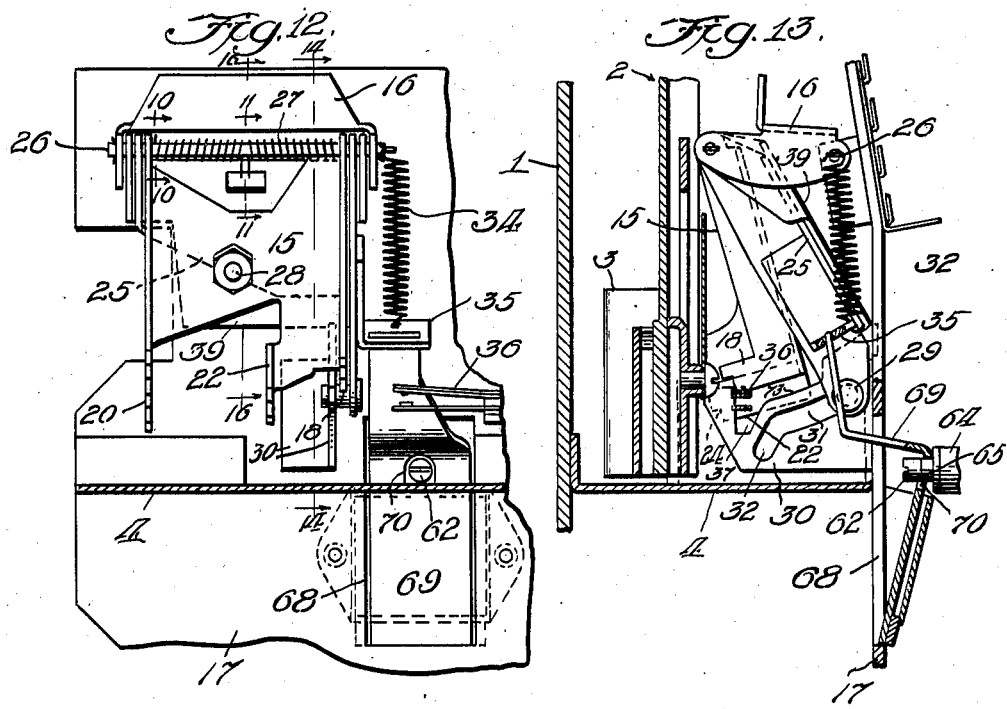

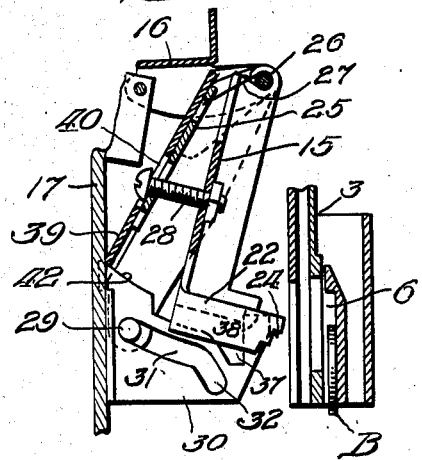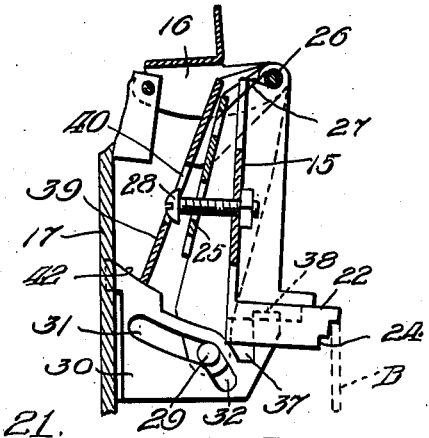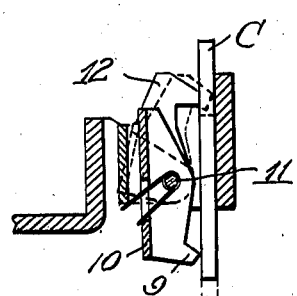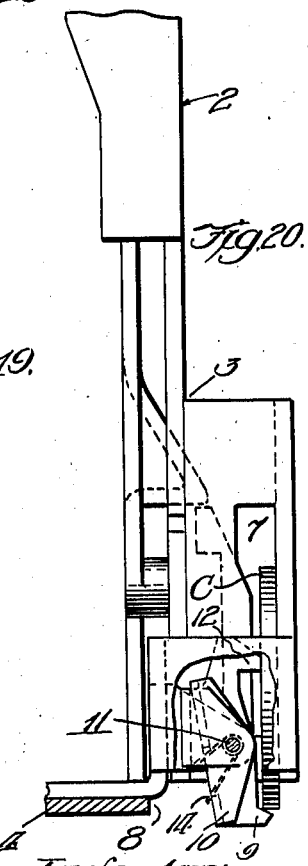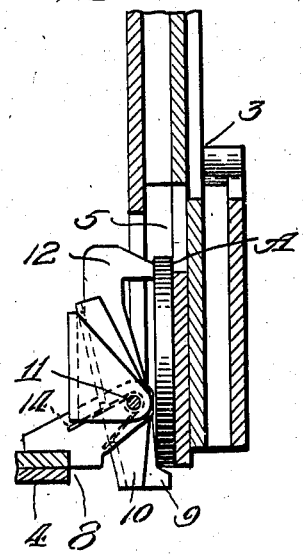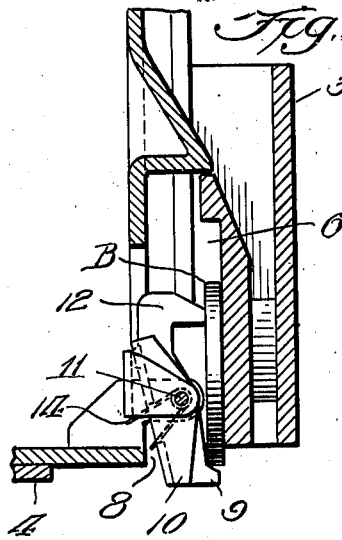

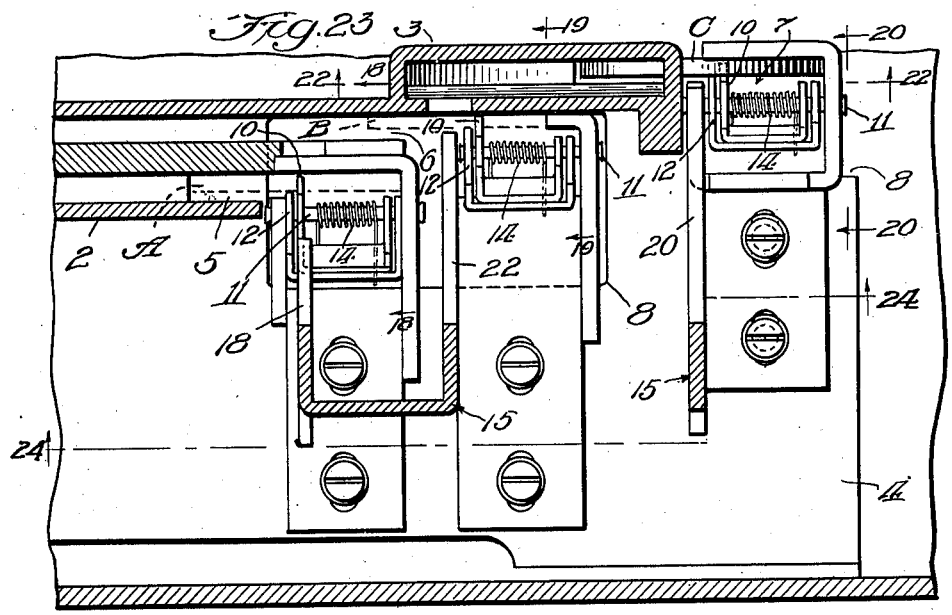
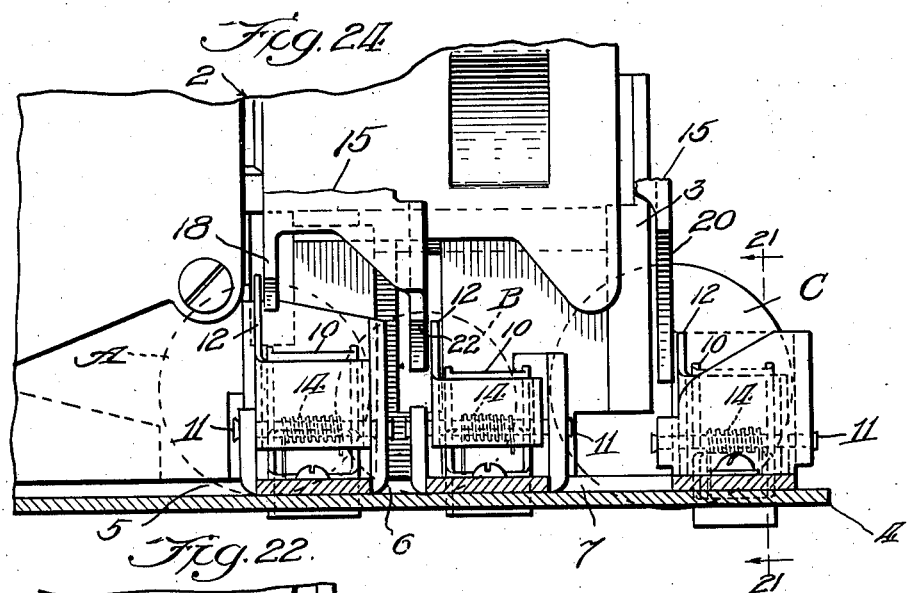
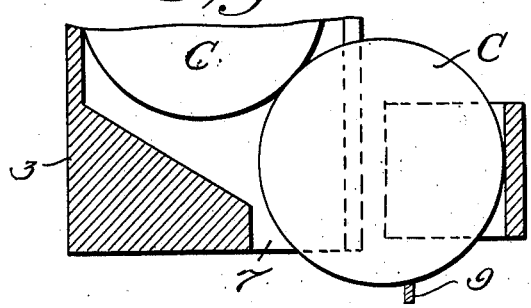

Patented May 9, 1944

2,348,434

UNITED STATES PATENT OFFICE 2,348,434

COIN-CONTROLLED SELECTOR

Earle G. Henry, Wilmette, Ill., assignor to Buckley Music System, Inc., a corporation of Illinois Application February 16, 1942, Serial No. 431,087

16 Claims. (Cl. 194—92)

In its broadest aspect the present invention may be said to relate to systems, mechanisms or apparatuses which are coin-controlled, that is, depend upon the insertion of coins or tokens of predetermined sizes or denominations, for the successful performance of their intended functions. Machines for vending articles and control systems for automatic musical instruments are examples.

The invention has for its object to produce an efficient, rugged and durable coin-controlled unit which shall make cheating impossible while avoiding structural damage if the unit be roughly treated by one attempting to cheat.

In its most highly developed form the invention is adapted for use with a plurality of coins of different denominations, so that it may be said to have for a further object the creation of such a unit which shall possess the desirable characteristics just described.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front view of a wall box containing a coin-controlled unit, embodying the present invention, for selecting, by remote control, any desired number of pieces to be played by an automatic phonograph or other musical instrument; Fig. 2 is a section on line 2—2 of Fig. 4, only the lower portion of the box being shown; Fig. 3 is a rear view of the dial unit removed from the box; Fig. 4 is a section on line 4—4 of Fig. 1, but on a larger scale than Fig. 1; Fig. 5 is a section, in a still larger scale, on line 5—5 of Fig. 1; Fig. 6 is a side elevation of the dial unit detached from the box; Fig. 7 is a section on line 7—7 of Fig. 6; Fig. 8 is a section on line 8—8 of Fig. 9; Fig. 9 is a section on line 9—9 of Fig. 4; Fig. 10 is a section on line 10—10 of Fig. 12, but on a larger scale; Fig. 11 is a section on line 11—11 of Fig. 12, on the same scale as Fig. 10; Fig. 12 is a section on line 12—12 of Fig. 4; Fig. 13 is a section on line 13—13 of Fig. 9; Fig. 14 is a section on line 14—14 of Fig. 12; Fig. 15 is an edge view of the structure shown in Fig. 12, looking at the same from the left; Fig. 16 is a section on line 16—16 of Fig. 12; Fig. 17 is a view similar to Fig. 16, but showing the parts in different positions; Fig. 18 is a section on line 18—18 of Fig. 23; Fig. 19 is a section on line 19—19 of Fig. 23; Fig. 20 is a section on line 20—20 of Fig. 23; Fig. 21 is a section on line 21—21 of Fig. 24; Fig. 22 is a section on line 22—22 of Fig. 23; Fig. 23 is a section on line 23—23 of Fig. 4, but on a larger scale than Fig. 4; and Fig. 24 is a section on line 24—24 of Fig. 23.

In the drawings I have illustrated my invention as embodied in mechanism mounted in or on a wall box to control musical instruments or machines adapted selectively to play any desired number of records and, for the sake of brevity, the detailed description will be confined to this particular embodiment.

Referring to the drawings, 1 represents a wall box containing in the rear thereof a unit 2, of well known construction, into which nickels, dimes and quarters are deposited for delivery at three separate coin stations. These stations are contained in a downward extension 3 of the unit 2. The member 3 is open at the lower end which is located a little above a horizontal stationary plate 4 extending from front to rear of the box at some distance above the bottom. These stations, which are numbered 5, 6 and 7, contain channels in which coins A, B and C may assume upright positions, when properly supported, above or partially in slots 8 in the wall 4. One of these slots, at the station for quarters, is shown in Figs. 4 and 20, while those for nickels and dimes appear in Figs. 18 and 19, respectively.

When a coin reaches any one of the stations it comes to rest on a nose 9 on the lower end of a little upright rocking dog 10 which is pivotally supported by a stationary horizontal pivot pin 11 extending through the same at about the middle. On each of the pivot pins is a second dog 12, that extends upwardly from the pivot pin. A light torsion spring 14 surrounds each of the pivot pins and has its ends engaged with shoulders on the two dogs. The dogs are so proportioned that when a coin rests on the nose of any one of the lower dogs, as indicated in Figs. 18, 19 and 20, the upper end of the corresponding upper dog engages the exposed front face of the coin. The purpose of the springs 14 is to cause both dogs to be pressed lightly against the coin and thus keep it from dropping through the slot. Whereas in Fig. 20 the quarter is resting on the nose of the lower dog, in Fig. 21, the quarter is shown as having been pushed down somewhat, so that the noses of both dogs bear against the face of the coin and constitute friction shoes to hold the coin in place. When the coin is pushed down far enough to permit the nose of the upper dog to swing back over the upper edge of the coin, as indicated in dotted lines in Fig. 21 the spring is no longer under tension and the coin is free to drop down into the bottom of the box.

The pairs of dogs may be alike except as their proportions may need to vary in order to permit the nickel to be ejected by a single stroke of an ejector, the dime by two strokes and the quarter by five strokes.

The immediate ejecting means is a long wide plate 15 hung from the rear end of an approximately horizontal support or carrier 16 which is hinged at its front edge to an upright stationary wall 17 in the front of the body portion of the box at an elevation considerably above the coin stations; both hinge axes being horizontal and parallel to the planes of coins in the coin stations. As shown in Figs. 12, 14 and 15, the plate 15 has at its two side edges a pair of flanges, one of which terminates at its lower end in a short rearwardly extending finger 18 having in the rear edge a single notch or step 19, while the other flange has at its lower end a long wide finger 20 extending rearwardly and containing in its rear edge five notches or steps 21. Between the fingers 18 and 20 is a third finger 22 formed by partially cutting away a part of the plate and bending it rearwardly. This third finger has two notches or steps 24 in its rear edge. When the ejector is operated as will hereinafter be described, if it finds a nickel in its station, the finger 18 comes down upon the nickel which is received in the notch and thus engages at both its upper edge and its front face with the finger. The nickel thus serves as a stop to limit the rearward movement of the ejector but can be driven down by the latter. If there be a dime in its station, the finger 22 engages the same, first in one notch and then in the other during two successive working strokes of the ejector. Likewise, if there be a quarter in its station, the finger 20 acts on the same, five ejecting movements of the ejector being required to discharge the quarter.

The immediate operating means for the ejector is a plate 25 lying in front of the ejector plate and hung from the same pivot or hinge pin 26 that supports the ejector. This hinge pin passes through the flanges at the vertical edges of both of these plates and, by making the flanges on the plate 25 wider than the others, the body portion of the plate 25 is caused to stand away from the body of the ejector plate. Surrounding the hinge pin 26 is a torsion spring 27 whose ends engage shoulders so placed on the plates 15 and 25 that these plates tend to swing away from each other. To limit the extent of this relative swinging movement I tie these plates loosely together, conveniently by means of a bolt 28 secured to the middle of plate 15 and passing loosely through a hole in the plate 25. Normally the spring 27 holds the plate 25 against the head of the bolt, as shown in Fig. 16. The assembly consisting of the carrier 16 and plates 15 and 25 is kept from dropping down, by providing one of the flanges of the member 25 with a laterally-projecting pin 29 that extends through a cam slot in a small vertical plate 30 fixed to and projecting rearwardly from the wall 17. As best shown in Figs. 16 and 17, the cam slot comprises a main section 31 extending rearwardly in the arc of a circle having the axis of the hinge pin 26 as a center, merging into a rear section 32 that inclines sharply in the downward direction. As long as the pin 29 remains in the section 31 of the slot the members 15 and 25 are limited to simple swinging movements from front to rear and the carrier 16 remains stationary; but, when the pin reaches section 32 of the slot, members 15 and 25 may move bodily in a downward direction, while carrier 16 swings downward about its hinge axis. During the first of these two movements of the members 15 and 25, they travel from the positions indicated in Fig. 16 to those which they occupy in Fig. 17, where one of the coin-ejecting fingers will be in engagement with a coin if there be a coin in one of the stations. Fig. 16 shows a dime in its station so that the upper edge of the dime will be engaged in the upper of the two notches 24 in the finger 22 when the parts are in the positions indicated in Fig. 17. The pin 29 is now at the juncture of the two slot sections 31 and 32 so that, upon further rearward movement of the actuator member 25, both it and the ejector travel down. This causes the dime to be pushed down far enough so that, upon retracting the ejector and again driving it back through a working stroke, the lower notch in the finger 22 engages the dime and the latter will be forced down far enough to be freed from its holding device and thus drop into the bottom of the box. Normally the carrier 16 and the members 15 and 25 are held in their idle, retraced positions illustrated in Fig. 16, by a strong tension spring 34 which, as best shown in Figs. 8 and 9, is attached at its upper end to one end of hinge pin 26 and at its lower end to an ear 35 extending laterally from the lower end of one of the flanges on the member 25. Actually, in the construction illustrated, the ear is one arm of an L-shaped plate welded to the outer face of said flange. This ear also serves to operate a controller at the end of an ejecting stroke. In the arrangement shown, the controller is simply a normally open switch 36 the movable member of which lies in the path of movement of the ear during the final downward movement of the latter.

It is imperative that the switch or other controller be not operated if the ejecting mechanism be operated in the absence of a coin. To prevent this, means are provided to prevent the ejector from making the final downward stroke which is necessary to drive a coin down, unless there be a coin present. It will be seen that in Fig. 17, the rearward swinging movement of the ejector has been arrested by the dime, whereas the actuator member 25 has moved closer to the ejector than is the case in the retracted position in Fig. 16; the pin 29 having just reached the point of downward turn in the coin slot. The cam plate 30 lies under the main portion of the ejector and contains in the top a deep notch 37 so disposed, as shown in Fig. 17 and better, perhaps, in Fig. 14, that the lower end of the body portion of the ejector can move down into this notch while the ejector is engaged with a coin. However, if there is no coin there to stop the rearward movement of the ejector, the body portion of the latter rides onto the shoulder 38 which is the rear end of the upper edge of the plate 30, and the ejector and the member 25 are prevented from moving down far enough to operate the switch or other controller. This follows from the fact that the relative positions of the parts illustrated in Fig. 17 are not established in the absence of a coin. If there were no coin present in Fig. 17, the plate 25 would still be in contact with the head of the screw 28 and the pin 29 would still be well forward in the slot 31.

Consequently, the plate 15 would move over the shoulder 38 before the pin 29 could start down the slot 32.

There is another type of manipulation against which one must guard. If the actuator be subjected to a sharp blow, the inertia of the ejector may be sufficient to hold it back long enough to enable the pin 29 to reach the cam slot 32 before the ejector reaches the shoulder 38, even in the absence of a coin. To prevent this from happening, I hang a third plate 39 from the hinge pin. This plate lies in front of the plate 25 and contains a large hole 40 through which the head of the bolt 28 may pass freely. A spring 41, similar to the spring 27, but slightly weaker, surrounds the hinge pin 26 and bears at its ends against shoulders on the plates 25 and 39 in such a manner as yieldingly to hold them together. Therefore, when it is attempted to drive the plate 25 back through the impact of a sharp blow, the spring holding the trailing plate 39 permits a greater lag in its movement relative to the movement of the plate 25 than is possible in the case of the ejector which must overcome the resistance of a stronger spring before there can be any relative movement between the same and the plate 25.

Advantage is taken of this difference in the rates of acceleration of the plates 15 and 39 to cause the latter plate to lock the movable assembly against such downward movement as is required for operating the switch or other controller. As shown in Figs. 14, 16 and 17, the cam plate 30 underlies the plate 39 as well as the plate 15, the forward portion 42 of its upper edge being raised to bring it close to the lower edge of plate 39 and being curved in the arc of a circle having its center at the axis of the hinge pin 26. When the mechanism is operated in the normal way from the idle positions of the parts as shown in full lines in Fig. 14, all three of the swinging plates assume the positions illustrated in broken lines by the time that the pin 29 reaches the upper end of the slot 32, following contact of an ejector finger with a coin. In other words, in normal operation, with a coin present, when the pin 29 reaches the upper end of the slot 32 and is ready to start down the same, the ejector is above the notch 37 and the plate 39 has moved beyond the rear end of the curved shoulder 42; and, consequently, further rearward movement of the actuator results in closing the switch, ejecting a coin if it be a nickel, or in moving a dime or quarter down through one of the plurality of steps needed to eject it.

In the arrangement shown, the coin ejecting and controller operating mechanism heretofore described is operated in conjunction with a selective dialing device of the same general nature as those shown in my prior Patents Nos. 2,219,257 and 2,222,564 and forming part of a system such as disclosed in my Patent No. 2,255,216. In that system there is a switch in the coin box, corresponding to the switch 36 in the instant case; together with a dial and circuit controller for selecting individual records to be played. In the present instance there is a dial 44, having thereon a knob 45 for turning the same, mounted on the front wall of the box in front of the coin ejecting and switch-operating mechanism. The knob has a long hub 46 that extends through a plate 47 on which the dialing unit is mounted and which is secured within the box behind a large opening in the front wall through which the dial and its knob are exposed. In actual practice the plate 47 is carried on the front ends of horizontal posts 48 fixed at their rear ends to the wall 17 in the box. Secured to and lying in front of this same wall is a plate 49 provided with a circle of stationary contacts 50 to be engaged successively by a contact finger 51 rotatable with the dial. As is usual, there are as many stationary contacts as there are numbers in the dial, each number and the corresponding contact representing a record to be played. Adjacent to each stationary contact is a radial slot 52. Slidable on but rotatable with the hub 46 is a plate 54 having two rearwardly projecting diametrically opposed fingers 55 that are adapted to enter the slots 52 when the plate 54 is pushed back far enough while these fingers are in registration with two of the slots. A spring 56, between the plate 54 and another plate 57 fastened against the rear end of the hub 46, normally holds the plate 54 forward with the fingers 55 standing clear of the slots 52. The plate 57 carries spring-pressed balls 58 adapted to be seated in little recesses 59 in the rear side of the plate 47, yieldingly to hold the dial in any one of its various positions into which it may be brought.

Extending through the dial unit, axially thereof, is a push rod 60 having a button 61 as its front end. This rod may be a long screw whose head 62 is at the rear end of the device. Loose on the rod, between the head 62 and a collar or spacer engaged with the rear side of the plate 57, is disk 65. Surrounding the rearward portion of the rod within the bores in the hub and the plates 54 and 57, through which the rod passes, is a sleeve 66 closed at its rear end. The sleeve is considerably shorter than the distance between the disk 65 and the button and its internal diameter is larger than the diameter of the rod. Surrounding the rod and extending from the button 61 into the sleeve and to the closed end of the latter is a compression spring 67.

The rod, with its push button, is the means by which the actuator plate 25 is moved in making working strokes. This is accomplished, as best shown in Figs. 12 and 13, by mounting on and extending through an opening 68 in the wall 17 a rocking lever 69, fulcrumed at its lower end on said wall and extending loosely through a slot in the ear 35 at its upper end. The rear end of the rod 60 extends through a hole 70 at about the middle of the lever. This hole is large enough to permit the screw head 62 to pass freely through the same but is narrower than the diameter of the disk 65. The parts are so proportioned that when they are all in their normal, idle positions as in Figs. 4, 5 and 13, the disk 65 contacts the lever. Upon pressing the push button, the driving lever is operated and, in turn, drives the actuator 25. It will be seen that the force applied to the push button is not transmitted directly to the driving lever but through the intermediary of the spring. Therefore, if for any reason the lever is prevented from making a complete working stroke, the spring 67 compresses, permitting the lever to stand still and the rear end of the push rod to pass freely through the same. This construction has the further function of preventing a full stroke of the ejector and the closing of the switch 36, in the event that the dial is stopped in a position intermediate between two dialing positions. In other words, if the dial is not brought to rest with the contact finger 51 in engagement with one of the stationary contacts 50, so that no selective circuit is being completed, the fingers or projections 55 will engage with the face of the plate 49 in areas lying between two pairs of slots 52; thereby causing the plate 54 to act as a stop in the path of the external flange 71 in the front end of the sleeve. In this way the customer is protected against waste of money, to the amount of a coin of the lowest denomination, through failure accurately to set the dial.

It is believed that the operation of my device has been described sufficiently in connection with the foregoing detailed description; it being possible to operate a controller once after the deposit of a nickel, twice in the case of a dime and five times when the coin is a quarter. Also, as best shown in Fig. 22, a plurality of coins of the same denomination may be inserted before manipulating the manually operable devices. Thus, in Fig. 22, the ejector can act on the lower of the quarters without interference by the second quarter which has not yet moved far enough to the left to be in position for ejection. It should, perhaps, also be noted that while the angular position of the ejector member 15 (namely that shown in broken lines in Fig. 14), is always the same when in contact with a nickel, that same angular position is the one occupied by the ejector in making the second ejecting movement with respect to a dime and the fifth such movement in the case of a quarter. When the ejector makes its first contact with a quarter, for example, as shown in Fig. 15 it has moved only a little way from the retracted position indicated in full lines in Fig. 14. Consequently, the body portion thereof does not need to enter the deep notch 37 in making its first downward stroke, since there is sufficient clearance between the depressed part 73 of the upper edge of the cam plate 30 lying between the raised stop portions or rails, 38 and 42, and the lower edge of the body portion of the member 15 to enable the latter to carry out the first three or four downward strokes to drive a quarter down.

The details of the coin box, itself, form no part of the present invention. However, it will be seen that the effective front and side walls comprise a single light unit 74 which is hinged to the sturdy back wall, as indicated at 75 in Fig. 8, and serves as a door. The front wall element of this unit contains a circular opening 76 larger in diameter than the knob, but smaller in diameter than the dial, so that the door may be swung open and shut, without disturbing any of the mechanism which I have described.

It will thus be seen that the customer is protected against being required to pay for a selection that is not completed, in the event that the dial has been turned a little too far or not far enough, how a selection cannot be made unless there be a coin in one of the stations, and how the customer is prevented from circumventing this last requirement by striking a sharp blow against the pushbutton. It will also be seen that the means employed to protect the customer, as aforesaid, also serves as a safeguard against the making of a plurality of selections at the cost of one. This is because whenever the dial is in such an angular position that the main switch can be closed and a coin be moved in the direction to eject it, the dial is locked in that position upon pressing the push button and is not again unlocked until the push button is released and the switch opened.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

1. In a coin-controlled controller, a coin station means yieldingly to support a coin at said station, a coin-moving member, said member having a variable movement from and toward said station and an ejecting movement to shift a coin encountered thereby at the station, means to prevent said member from making an ejecting movement when it travels toward and into said station while the latter is empty, the ejecting movement being parallel to the plane of the coin, and said member having a plurality of elements distributed along the same and adapted successively to engage an edge of the coin during successive like ejecting movements to move the coin step by step.

2. In a coin-controlled controller, a coin station, means yieldingly to support a coin at said station, actuating means including a coin moving member, said member having a movement from and toward said station and a fixed ejecting movement parallel to a coin encountered thereby at the station, and means to prevent said member from making an ejecting movement when it travels toward and into said station while the latter is empty; said member having a plurality of pairs of coin-ejecting shoulders, one shoulder of each pair being adapted to engage the side of a coin when said member moves toward the coin while the other shoulder engages the edge of the coin to cause the coin to be moved through a predetermined step during an ejecting movement; said pairs of shoulders being disposed on said member in such a manner that they successively engage the coin during successive ejecting movements and a movable controller element in position to be operated by said actuating means during each ejecting movement of said coin-moving member.

3. In a coin-controlled controller, a coin station, means yieldingly to support a coin at said station, a coin-moving member, said member having a movement from and toward said station and an ejecting movement of fixed length parallel to the plane of a coin in said station, and means to prevent said member from making an ejecting movement when it travels toward and into said station while the latter is empty; said member having a plurality of shoulders to engage, one at a time, with the side of a coin occupying said station when said member is moved toward the latter, depending upon the position of the coin in said station; together with other shoulders adapted successively to engage the edge of such coin during successive ejecting movements.

4. In a coin-controlled controller, a coin station, means yieldingly to support a coin at said station, a coin-moving member, said member having a swinging movement from and toward said station and an ejecting movement parallel to the plane of a coin in said station, and means to prevent said member from making an ejecting movement when it travels toward and into said station while the latter is empty; said member having therein a plurality of notches in which an edge of a coin in said station is successively engaged during successive ejecting movements of said member.

5. In a coin-controlled controller, a row of stations each adapted to receive a coin of different denominations than that for which the other stations are adapted, means at the stations yieldingly to hold coins so as to permit them to be moved edgewise when pressure is exerted against their edges, a coin-moving member having coin-engaging elements corresponding in number and distribution to said stations, said member being movable to carry said elements toward and from said stations and being adapted to make a coin-ejecting movement when said elements reach the said stations, and means to prevent coin-ejecting movements of said member when all of said stations are empty.

6. In a coin-controlled controller, a row of stations each adapted to receive a coin of different denomination than that for which the other stations are adapted, means at the stations yieldingly to hold coins so as to permit them to be moved edgewise when pressure is exerted against their edges, a coin moving member having coin-engaging elements corresponding in number and distribution to said stations, each of said elements being provided with one or more notches in which an edge of a coin may be engaged, said member being movable to carry said elements toward and from said stations and being adapted to make a coin-ejecting movement when said elements reach the said stations, and means to prevent coin-ejecting movements of said member when all of said stations are empty.

7. In a coin-controlled controller, a station for a coin, a carrier pivotally supported at one end for swinging movements downward from a more or less horizontal position, a member hung from the free end of said carrier for swinging movements toward and from said station, a control device, means to operate said device when said carrier swings down, means to prevent said carrier from swinging down until said member reaches the position for contacting a coin in said station, and means to prevent downward movement of the said carrier whenever said member travels beyond the last-mentioned position into an empty station.

8. In a coin-controlled controller, a station for a coin, a carrier supported in front of said station for downward swinging movements, two members suspended from said carrier, one behind the other, an actuator depending from said carrier between said members, the member nearest the station being a coin ejector, a spring between the actuator and the coin ejector yieldingly to hold them apart, a spring between the actuator and the other member holding them together, rails underlying said members and preventing bodily downward movements of the latter while the lower end of either member is positioned over the corresponding rail, said rails being so disposed that when the coin ejecting member engages a coin in said station it has not quite reached its rail while the trailing member is still over the other rail, and means to force the actuator down after it has moved ahead far enough to carry the trailing member off its rail following the engagement of the ejector with the coin.

9. In a coin-controlled controller, a support, a coin-ejecting member and a second member suspended from the support for swinging movements and a coin-ejecting movement, an actuator between said members, a spring between the actuator and the ejecting member holding them yieldingly apart, a weaker spring holding the actuator and the trailing member together, and means cooperating with said trailing member to prevent the coin ejecting movement from taking place when that member, due to its inertia, lags behind the actuator in the event that the actuator is struck a sharp blow.

10. In a coin controlled apparatus, a station containing a channel for a coin standing on edge, the channel being sufficiently open to leave one face of a coin therein exposed, and a combined coin support and pressure shoe mounted adjacent to said channel for engagement with the lower edge and also with the exposed face of the coin; said shoe being yieldable so that downward pressure on the coin causes the coin to push the underlying part of the shoe out of the way and the shoe to be pressed against the side of the coin.

11. In a coin controlled apparatus, a station containing a channel for a coin standing on edge, the channel being sufficiently open to leave one face of a coin therein exposed, two pivotally mounted dogs adjacent to said channel, one above the other, and capable of swinging from and toward the channel about a horizontal axis parallel to the exposed face of the coin, the free end of the lower dog being adapted to underlie a coin in the channel, and spring means acting on said dogs yieldingly to hold the free end of the lower dog in coin-supporting position and the free end of the upper dog against the exposed face of the coin upon the entry of the latter into the station.

12. In combination, a multi-position rotatable selective device, a controller, a stationary element located behind said device and having therein slots corresponding to the positions of said device, a push rod extending loosely through the center of said device and said element, a controller to be actuated by said push rod, a member rotatable with said device and movable relatively thereto toward and from said element, a shoulder on the push rod to move said member toward said element when the rod begins an actuating stroke, and a finger on said member adapted to enter any one of said slots with which it may be in registration at the time the rod is making an actuating stroke and to prevent normal completion of such stroke by said shoulder at times when the finger does not register with any slot.

13. In combination, a multi-position rotatable selective device, a controller, a stationary element located behind said device and having therein slots corresponding to the positions of said device, a push rod extending loosely through the center of said device and said element, a controller in position to be actuated by said rod, a member rotatable with said device and movable relatively thereto toward and from said element, a shoulder on the rod to engage said member and move it towards said element when the rod begins an actuating stroke, a finger on said member adapted to enter any one of said slots with which it may be in registration before the rod has completed an actuating stroke, said shoulder being movable along the rod, and a strong spring holding said shoulder in a predetermined working position on the rod but permitting the rod to continue to move ahead in case said finger strikes said element and stops the shoulder.

14. The combination with a coin-controlled apparatus including a rotatable selective device and an ejector for coins received in the apparatus, of means to operate said ejector including a member extending through and coaxial with the selective device and having ejecting movements relatively to that device, and an interlock between said member and the selective device to lock the latter against movements during ejecting movements of said member.

15. The combination with a coin-controlled apparatus including a rotatable selective device having a plurality of predetermined selecting positions and an ejector for coins received in the apparatus, of means to operate the ejector including a member extending through and coaxial with the selective device and having ejecting movements relatively to said device, and means actuated by said member in making an ejecting movement to lock the selective device against movement out of any of said predetermined positions which it may be occupying at the time said member is making an ejecting movement.

16. In a coin-controlled apparatus, a station containing a channel for a coin standing on edge, the channel being sufficiently open for at least a portion of its length to leave a face of a coin therein exposed, a shoe device mounted in front of the open portion of said channel for rocking movements into and out of said channel about a horizontal axis and in a plane at right angles to the face of a coin in the channel, the parts being so proportioned that there is sufficient space behind the upper end of the shoe device for the passage of a coin in the channel at times when the lower end of said device projects into the channel to arrest downward movement of the coin, and the shoe device being yieldable to cause its lower end to be pushed out of the way by the coin and the upper end to be pressed against the face of the coin when a force is applied to the coin in a direction to drive it down.

EARLE G. HENRY.